Sept. 18, 1962  H. PROHASKA ET AL  3,054,128
CONNECTING DEVICE FOR WINDSHIELD WIPER BLADE
Filed April 19, 1960

HANS PROHASKA
ALFRED KOHLER
INVENTORS.

BY Dicke, Craig & Freudenberg
ATTORNEYS

United States Patent Office 3,054,128
Patented Sept. 18, 1962

3,054,128
CONNECTING DEVICE FOR WINDSHIELD
WIPER BLADE
Hans Prohaska and Alfred Kohler, Bietigheim, Württemberg, Germany, assignors to SWF-Spezialfabrik für Autozubehör Gustav Rau G.m.b.H., Bietigheim, Württemberg, Germany
Filed Apr. 19, 1960, Ser. No. 23,223
Claims priority, application Germany Apr. 24, 1959
6 Claims. (Cl. 15—250.32)

The present invention relates to a windshield wiper, especially for motor vehicles, and more particularly to the means for removably connecting a wiper blade to a wiper arm.

It is an object of the invention to provide a very simple and inexpensive device for pivotably connecting a wiper blade to a wiper arm so as to be safely locked thereto and to be easily removable therefrom.

Another object of the invention is to provide a locking device which may be mounted within the walls of a yokelike blade carrier of a shallow U-shaped cross section without requiring any outwardly projecting super-structure on the blade carrier, so that the entire windshield wiper will be as low as possible.

A further object of the invention is to provide a connecting and locking device of the mentioned type which permits the connecting end of the wiper arm to be of a simple hooklike U-shape with the two arms of the hook extending substantially parallel to each other.

According to the invention, the yokelike blade carrier is made of a substantially rectangular cross section of an inverted U-shape with a central aperture in its back through which the hooklike end of the wiper arm may be inserted which may then be hooked over a pivot pin which is provided with an elastic sleeve and is mounted between the side walls of the blade carrier. In order to lock the blade carrier to the hook-shaped end of the wiper arm and at the same time to close the aperture in the back of the blade carrier, the invention provides at the inside of the angular U-shaped profile of the blade carrier a locking member which may be operated by hand from the outside through the aperture in the back of the blade carrier if it becomes necessary to remove the latter from the wiper arm.

According to one preferred embodiment of the invention, this locking member is made of an elastic material, for example, of rubber or a resilient plastic, and of a budlike shape with a stem portion which is secured to the back of the blade carrier at the inside thereof. The enlarged head of this locking member is adapted to engage with its front end against the outer surface of the hook on the wiper arm, and it also has an upper projection which is adapted to engage from the inside into the aperture in the back of the blade carrier and to close the same completely against the hooklike end of the wiper arm. For this purpose, the mentioned projection has at one side a shoulder which, when the projection is pushed from the inside into the aperture, engages against the edge of the back, while a curved lip at the other side of the projection snaps over the rounded outer surface of the hook and overlaps the same, thereby retaining the locking member securely in its locking position. In order to increase the rigidity of the locking member, the stem thereof is preferably made of a special reinforcing cross-sectional shape, for example, a U-shape.

According to a modification of the invention, the locking member is preferably made of a less-resilient plastic, and its rear end is pivotably mounted between the side walls of the blade carrier on a pin which also carries a coil spring which tends to pivot the locking member upwardly so that its front end engages against the rounded outer surface of the hook of the blade arm, while the rear shoulder on its upper projection engages against the edge of the back of the blade carrier. Since in this embodiment the locking member is held in its locking position by spring action, it is not necessary to provide its upper projection with a lip which snaps over the rounded end of the hook. Obviously, however, if the locking member is made of a resilient plastic and provided with such a lip, the spring may be omitted.

In order to remove the blade carrier from the wiper arm, or vice versa, it is only necessary to turn the blade carrier and the wiper arm at a right angle to each other and to depress the projecting portion of the locking member which fills out the aperture in the back of the blade carrier at one side of the pivot pin carrying the hook-shaped end of the wiper arm. Thereupon, the latter may be easily unhooked from the pivot pin and pulled out of the aperture.

The new connecting device maintains the blade carrier in the proper operating position, while still allowing it to pivot relative to the wiper arm in accordance with the curvature of the windshield; it locks the blade carrier securely to the wiper arm, closes the otherwise unsightly aperture in the back of the blade carrier, and permits the entire blade with its carrier to be easily attached to and removed from the wiper arm.

These objects, features, and advantages of the present invention will become further apparent from the following detailed description thereof, particularly when the same is read with reference to the accompanying drawings, in which—

Figure 6:
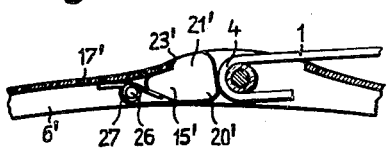
Figure 7:
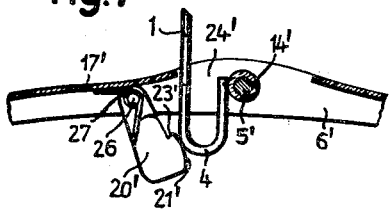

FIGURE 6 shows a similar cross section of the connected parts of the wiper arm and blade carrier in which the latter is provided with a locking member according to a modification of the invention; while FIGURE 7 shows a similar cross section of the embodiment according to FIGURE 6, with the central part of the blade carrier in the process of being attached to or removed from the end of the wiper arm.

Figure 1:
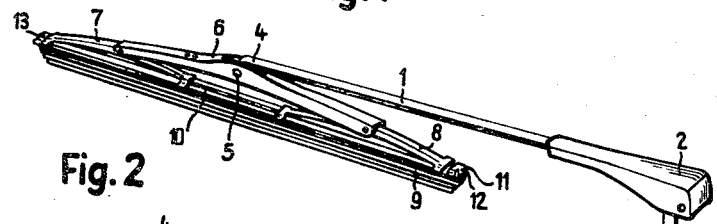
FIGURE 1 shows a perspective view of a wiper arm and a wiper blade connected thereto.
Figure 2:
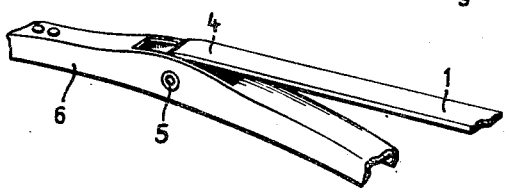
FIGURE 2 shows a similar but enlarged perspective view of the connected parts of the wiper arm and wiper blade carrier.

As illustrated in FIGURE 1, the wiper arm 1 is provided at one end in the usual manner with a head portion 2 which is attached to the shaft 3 which is driven by the windshield wiper motor, not shown. The other end of wiper arm 1 is bent over to form a U-shaped hook 4 into which the pivot pin 5 on the blade carrier 6 is inserted. Each outer end of blade carrier 6 has pivotably connected thereto an intermediate yoke 7 or 8, the outer clawlike ends of which partly surround the spring rails 10 or 11 which carry the rubber blade 9. For securing the two spring rails 10 and 11 to each other, their outer ends are provided with connecting brackets 12 and 13.

Figure 3:
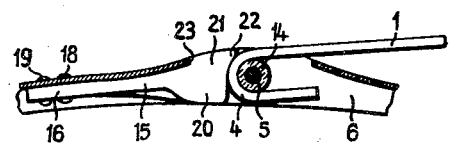
FIGURE 3 shows a cross section of the central part of the blade carrier with the connecting end of the wiper arm in the operative position.
Figure 4:
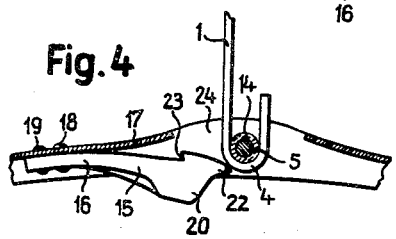
FIGURE 4 shows a similar cross section of the same parts with the locking member on the blade carrier in the position in which it releases the connecting end of the wiper arm.
Figure 5:
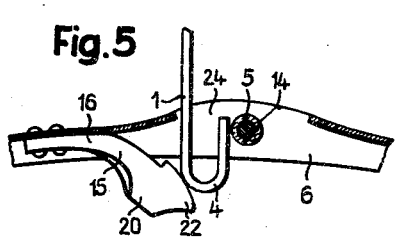
FIGURE 5 shows a similar cross section of the same parts, with the central part of the blade carrier in the process of being attached to or removed from the end of the wiper arm.

As illustrated particularly in FIGURES 3, 4, and 5, the pivot pin 5 on blade carrier 6 is covered by a bushing 14 of an elastic material which, when it is inserted into the U-shaped end 4 of wiper arm 1, engages with the inner semicircular surface thereof. Blade carrier 6 has a substantially rectangular cross section of an inverted U-shape. A bud-shaped locking member 15 of an elastic material is disposed at the inner side of blade carrier 6 between the side arms thereof and at the side facing toward yoke 7, and its stemlike end portion 16 is secured to the back 17 of blade carrier 6 by rivets 18 and 19. The stem-like end portion 16 has a reinforcing cross-sectional configuration, preferably a U-shaped configuration. The enlarged head 20 of locking member 15 engages with its front end against the outer surface of hook 4, while an upper projection 21 on head 20 has a projecting lip 22 at its front end which partly overlaps hook 4, and a shoulder 23 at its rear end which engages against the edge of back 17. Thus, when blade carrier 6 is attached to hook 4 on wiper arm 1, and head 20 of locking member 15 is in the position as shown in FIGURE 3, the projections 21 of head 20 will completely close the aperture 24 between the front edge of back 17 and hook 4, while the overlapping lip 22 locks head 20 within aperture 24 and prevents it from sliding downwardly. If blade carrier 6 is to be removed from wiper arm 1, blade carrier 6 and wiper arm 1 are pivoted relative to each other so as to extend at a substantially right angle to each other, while at the same time a pressure is exerted upon the upper surface of projection 21 within aperture 24 so that lip 22 will yield elastically and projection 21 will be pushed out of aperture 24, and locking member 15 will be bent downwardly to the position as illustrated in FIGURE 4. Thereupon, blade carrier 6 may be unhooked from wiper arm 1, as shown in FIGURE 5, and hook 4 may be pulled out of the blade carrier through aperture 24.

According to the modification of the invention as illustrated in FIGURES 6 and 7, the rear end of locking member 15' is pivotably mounted on a pin 26 which is secured in the side walls of blade carrier 6' and also carries a coil spring 27, one arm of which rests on the back 17' of blade carrier 6', while the other arm acts upon the head 20' of locking member 15' to urge the same into the locking position. The front side of head 20' then engages with the outer surface of hook 4, while the shoulder 23' adjacent upper projection 21' on head 20' engages against the edge of back 17'. If blade carrier 6' is to be removed from wiper arm 1, the projection 21' is depressed to pivot locking member 15' downwardly while at the same time the wiper arm and blade carrier are pivoted relative to each other similarly as described with reference to FIGURE 4, whereupon the wiper arm 1 may be unhooked from pin 5', 14', as shown in FIGURE 7, and be pulled out of aperture 24' in blade carrier 6'.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A windshield wiper assembly comprising a wiper arm with an end portion bent over about an angle of substantially 180° to form a rounded hook, a blade carrier of a substantially rectangular, inverted U-shaped cross sectional profile provided with an aperture in its back for inserting said rounded hook, a pivot pin secured within said blade carrier within an area underneath said aperture, said rounded hook being adapted to partly surround said pivot pin, and an elastic locking member mounted within the U-shaped profile of said blade carrier and having one end engaging against said rounded hook and also partly closing said aperture in an operative position thereof, said locking member being adapted to be pivoted manually from the outside through said aperture for disengaging and removing said hook from said pivot pin, said locking member being substantially bud-shaped, having a thin stem part secured to said blade carrier at the inner side thereof, and having an enlarged head adapted to engage at its end against the outer surface of said rounded hook, said head having an upper projection at one side adapted to close said aperture, said projection having a shoulder at its rear end adapted to engage against an edge of the back of said blade carrier defining said aperture.

2. A windshield wiper assembly as defined in claim 1, wherein said thin stem part is provided with a reinforcing cross-sectional configuration.

3. In a windshield wiper assembly as defined in claim 1, in which the front end of said upper projection on said locking member forms a projecting lip adapted to snap over and partly enclose said rounded hook.

4. In a windshield wiper assembly having a wiper arm with an end portion bent over about an angle of substantially 180° to form a rounded hook, a blade carrier having an essentially V-shaped profile and provided with aperture means for inserting said hook through a back part thereof, a pivot pin secured within said blade carrier within an area underneath said aperture means, said hook being adapted to partly surround said pivot pin, the improvement comprising an elastic locking member mounted within the U-shaped profile of said blade carrier and having one end engaging against a rounded portion of said hook and also partly closing said aperture means in an operative position thereof, said one end having a projecting lip portion in snap-fit engagement with and partially enclosing said hook in said operative position, said locking member being manually pivotable from the outside through said aperture means for disengaging and removing said hook from said pivot pin.

5. A windshield wiper assembly comprising a wiper arm with an end portion bent over to form a rounded hook, a blade carrier of an inverted U-shaped cross sectional profile provided with an aperture in its back for inserting said hook, a pivot pin secured within said blade carrier within an area underneath said aperture, said hook being adapted to partly surround said pivot pin, and an elastic locking member pivotably mounted at one end on a pin secured within the U-shaped profile of said blade carrier, said locking member being adapted to engage with its other end against the outer surface of said rounded hook and having an upper projection adapted to partly close said aperture, said projection having a shoulder at its rear end adapted to engage against the edge of the back of said blade carrier defining said aperture, said locking member being adapted to be pivoted manually from the outside through said aperture for disengaging and removing said hook from said pivot pin.

6. In a windshield wiper assembly as defined in claim 5, in which a spring is mounted within said blade carrier and acting upon said locking member to pivot the same into its locking position in engagement with said hook, in which position said locking member also closes said aperture.

References Cited in the file of this patent

UNITED STATES PATENTS 2,432,692 Smulski _____ Dec. 16, 1947